US009607766B2

(12) United States Patent
Saito

(10) Patent No.: US 9,607,766 B2
(45) Date of Patent: Mar. 28, 2017

(54) LAMINATED CERAMIC CAPACITOR

(71) Applicant: TAIYO YUDEN CO., LTD., Taito-ku, Tokyo (JP)

(72) Inventor: Kenji Saito, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 14/406,905

(22) PCT Filed: Oct. 24, 2012

(86) PCT No.: PCT/JP2012/077458
§ 371 (c)(1),
(2) Date: Dec. 10, 2014

(87) PCT Pub. No.: WO2013/190718
PCT Pub. Date: Dec. 27, 2013

(65) Prior Publication Data
US 2015/0131201 A1 May 14, 2015

(30) Foreign Application Priority Data
Jun. 19, 2012 (JP) .................. 2012-137898

(51) Int. Cl.
*H01G 4/30* (2006.01)
*H01G 4/12* (2006.01)
(Continued)

(52) U.S. Cl.
CPC .......... *H01G 4/1227* (2013.01); *H01G 4/008* (2013.01); *H01G 4/012* (2013.01); *H01G 4/12* (2013.01);
(Continued)

(58) Field of Classification Search
CPC H01G 4/12; H01G 4/30; H01G 4/005; H01G 4/232
(Continued)

(56) References Cited

U.S. PATENT DOCUMENTS 6,710,998 B1 * 3/2004 Saito .................. H01G 4/30
257/296
2011/0110014 A1 5/2011 Hirata et al.
(Continued)

FOREIGN PATENT DOCUMENTS

JP H03-246915 A 11/1991
JP H09-097733 A 4/1997
(Continued)

OTHER PUBLICATIONS

International Search Report (ISR), mailed Nov. 27, 2012, issued for International Application No. PCT/JP2012/077458.
(Continued)

*Primary Examiner* — Nguyen Ha
(74) *Attorney, Agent, or Firm* — Law Office of Katsuhiro Arai

(57) ABSTRACT

A laminated ceramic capacitor is characterized in that when the section constituted by two internal electrode layers positioned adjacent to each other in the laminating direction and one dielectric layer present between the two internal electrode layers is considered a unit capacitor, then the respective capacitances of the unit capacitors arranged in the laminating direction are distributed in such a way the capacitance at the center in the laminating direction is lower than the capacitances at both ends in the laminating direction. The laminated ceramic capacitor is resistant to deterioration of insulation resistance.

7 Claims, 2 Drawing Sheets

(51) Int. Cl.
  *H01G 4/008* (2006.01)
  *H01G 4/012* (2006.01)
  *H01G 4/248* (2006.01)
(52) U.S. Cl.
  CPC .......... *H01G 4/1236* (2013.01); *H01G 4/248* (2013.01); *H01G 4/30* (2013.01)
(58) Field of Classification Search
  USPC ......... 361/321.2, 301.4, 306.1, 306.3, 321.1, 361/303–305
  See application file for complete search history.

(56) References Cited

U.S. PATENT DOCUMENTS

| | | |
|---|---|---|
| 2012/0062338 A1 | 3/2012 | Kanno |
| 2012/0188681 A1* | 7/2012 | Togashi ................ H01G 4/012 361/301.4 |
| 2014/0078641 A1 | 3/2014 | Hirata et al. |

FOREIGN PATENT DOCUMENTS

| | | |
|---|---|---|
| JP | 2005-281066 A | 10/2005 |
| JP | 2006-179643 A | 7/2006 |
| JP | 2008-226941 A | 9/2008 |
| JP | 2012-060030 A | 3/2012 |
| WO | 2010/146967 A1 | 12/2010 |

OTHER PUBLICATIONS

Notification of Transmittal of Translation of the International Preliminary Report on Patentability (PCT/IB/338) mailed Dec. 31, 2014, with International Preliminary Report on Patentability (PCT/IB/373) and Written Opinion of the International Searching Authority (PCT/ISA/237), for corresponding international application PCT/JP2012/077458.

* cited by examiner

|  | Dielectric layer thickness (μm) | Capacitance (nF) | HALT result (sec) |
|---|---|---|---|
| Sample 1 | 1.0 | 6424 | 5462 |
| Sample 2 | 1.0 | 6590 | 5600 |
| Comparative Sample 1 | 1.0 | 6433 | 2309 |
| Sample 3 | 0.8 | 8030 | 3529 |
| Sample 4 | 0.8 | 8136 | 3421 |
| Comparative Sample 2 | 0.8 | 8042 | 120 |
| Sample 5 | 3.0 | 2008 | 12050 |
| Sample 6 | 3.0 | 2066 | 11983 |
| Comparative Sample 3 | 3.0 | 2004 | 8305 |

LAMINATED CERAMIC CAPACITOR

This application is the U.S. National Phase under 35 U.S.C. §371 of International Application PCT/JP2012/077458, filed Oct. 24, 2012, which claims priority to Japanese Patent Application No. 2012-137898, filed Jun. 19, 2012. The International Application was published under PCT Article 21(2) in a language other than English.

TECHNICAL FIELD

The present invention relates to a laminated ceramic capacitor with a capacitor body having a structure in which multiple internal electrode layers are laminated with dielectric layers placed in between.

BACKGROUND ART

The need for smaller, larger-capacity laminated ceramic capacitors of this type remains strong, and this need cannot be met without further reducing the thickness of internal electrode layers and dielectric layers. However, further thickness reduction of dielectric layers, or specifically to a thickness of 1.0 µm or less per dielectric layer, increases the likelihood of deterioration of the insulation resistance of the laminated ceramic capacitor.

Oxygen defect (structural defect) occurring in the dielectric crystal in a high electric field is considered a primary cause of the aforementioned deterioration of insulation resistance, but whatever the true cause, this deterioration of insulation resistance directly affects the service longevity of the laminated ceramic capacitor and must be remedied as soon as possible.

The inventor of the present invention explored various measures to remedy the aforementioned deterioration of insulation resistance in consideration of cost and arrived at a way to suppress such deterioration of insulation resistance, which is different from what is described in Patent Literature 1 below, and consequently developed the present invention.

PRIOR ART LITERATURE

Patent Literature

Patent Literature 1: Japanese Patent Laid-open No. 2005-281066

SUMMARY OF THE INVENTION

Problems to Be Solved by the Invention

An object of the present invention is to provide a laminated ceramic capacitor resistant to deterioration of insulation resistance.

Means for Solving the Problems

To achieve the aforementioned object, the present invention is a laminated ceramic capacitor with a capacitor body having a structure in which multiple internal electrode layers are laminated with dielectric layers placed in between, wherein such laminated ceramic capacitor is characterized in that, when the section constituted by two internal electrode layers positioned adjacent to each other in the laminating direction and one dielectric layer present between the two internal electrode layers is considered a unit capacitor, then the respective capacitances of multiple unit capacitors arranged in the laminating direction are distributed in such a way that the capacitance at the center in the laminating direction is lower than the capacitances at both ends in the laminating direction.

Effects of the Invention

A laminated ceramic capacitor whose multiple unit capacitors arranged in the laminating direction have their respective capacitances distributed in such a way that the capacitance at the center in the laminating direction is lower than the capacitances at both ends in the laminating direction, is more resistant to deterioration of insulation resistance compared to a laminated ceramic capacitor having no such distribution. Accordingly, a laminated ceramic capacitor resistant to deterioration of insulation resistance can be provided even when the dielectric layer thickness is reduced to meet the need for smaller size and larger capacity.

The aforementioned and other objects, constitutional characteristics, and operations and effects, of the present invention, are made clear by the explanation provided below and drawings attached hereto.

BRIEF DESCRIPTION OF THE DRAWINGS

FIG. 1 (B) is a lateral section view of the same laminated ceramic capacitor, cut along line B-B in FIG. 1 (A); FIG. 1 (C) shows the equivalent circuit of the same laminated ceramic capacitor; and FIG. 1 (D) shows the distribution of the capacitances of unit capacitors contained in the same laminated ceramic capacitor.

MODE FOR CARRYING OUT THE INVENTION

<<Structure of Laminated Ceramic Capacitor>>

Figure 1:
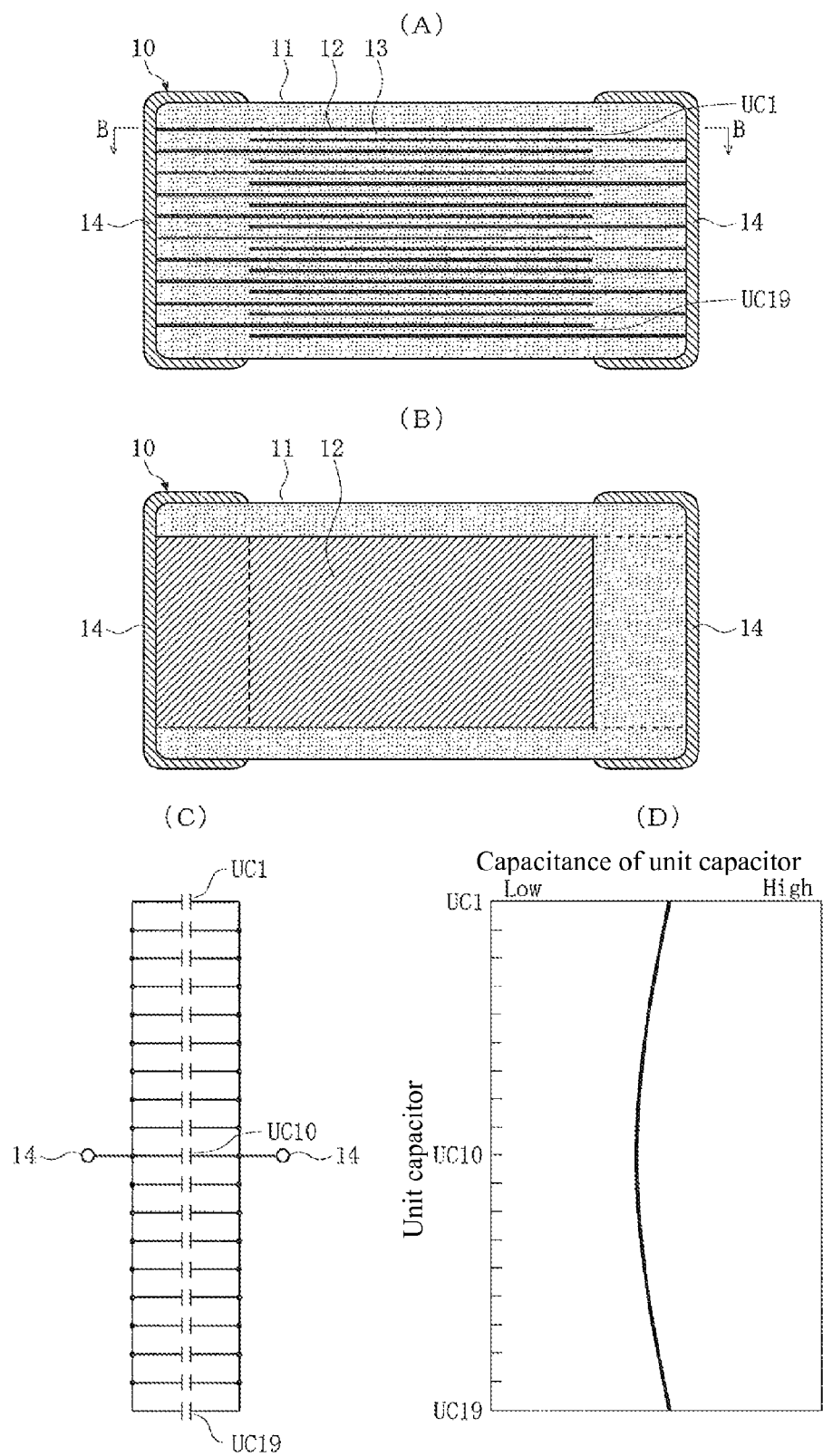
FIG. 1 (A) is a longitudinal section view of a laminated ceramic capacitor to which the present invention is applied.

First, the structure of a laminated ceramic capacitor 10 to which the present invention is applied is explained by referring to FIGS. 1 (A) to (D).

The laminated ceramic capacitor 10 shown in FIGS. 1 (A) and (B) has a capacitor body 11 of roughly rectangular solid shape whose reference length, width and height dimensions have the relationship "Length>Width=Height," as well as a pair of external electrodes 14 provided at both ends of the capacitor body 11 in the length direction. The aforementioned length corresponds to the dimension in the lateral direction in FIG. 1 (A), aforementioned width corresponds to the dimension in the vertical direction in FIG. 1 (B), and aforementioned height corresponds to the dimension in the vertical direction in FIG. 1 (A). In addition, the aforementioned dimensional relationship is not limited to "Length>Width=Height," but it may also be "Length>Width>Height," for example.

The capacitor body 11 has a structure comprising a total of 20 internal electrode layers 12 laminated with (a total of 19) dielectric layers 13 placed in between. Additionally, there are top and bottom margins (not illustrated), each comprising a laminate of multiple dielectric layers 13 only, above the top internal electrode layer 12 and below the bottom internal electrode layer 12, of the capacitor body 11, respectively. Furthermore, there are left and right margins (not illustrated), each comprising multiple dielectric layers 13 only, on one side and the other side of the capacitor body 11 in the width direction, respectively. While the laminated ceramic capacitor 10 shown in FIGS. 1 (A) and (B) has 20 internal electrode layers 12 for the purpose of illustration, actual laminated ceramic capacitors meeting the need for smaller size and larger capacity have 100 or more internal electrode layers.

Each internal electrode layer 12 is made of nickel, copper, palladium, platinum, silver, gold, alloy thereof, or the like and the thickness, composition, and shape in top view (roughly rectangular) of each layer are roughly the same. Each dielectric layer 13, including dielectric layer 13 constituting the top and bottom margins, is made of barium titanate, strontium titanate, calcium titanate, magnesium titanate, calcium zirconate, calcium zirconate-titanate, barium zirconate, titanium oxide, or the like, and the thickness, composition, and shape in top view (roughly rectangular) of each layer are roughly the same, but this shape in top view is longer and wider than the shape of each internal electrode layer 12 in top view.

Of the total 20 internal electrode layers 12, the (total 10) odd-numbered internal electrode layers 12 from the top and (total 10) even-numbered internal electrode layers 12 from the top are staggered in the length direction, where the odd-numbered internal electrode layers 12 from the top are electrically connected to the left external electrode 14, while the even-numbered internal electrode layers 12 from the top are electrically connected to the right external electrode 14.

Each external electrode 14 has a two-layer structure comprising a base layer (not illustrated) adhered tightly to either end of the capacitor body 11 in the length direction and a surface layer formed on the surface of the base layer, or a three-layer structure with an intermediate layer provided between the base layer and surface layer. Preferably the base layer is made of the same material as the internal electrode layer 12, the surface layer is made of tin, palladium, gold, zinc, or the like, and the intermediate layer is made of platinum, palladium, gold, copper, nickel, or the like.

Assume that the section constituted by two internal electrode layers 12 positioned adjacent to each other in the vertical direction, or specifically the laminating direction, of the capacitor body 11 on one hand, and by one dielectric layer 13 present between the two internal electrode layers 12 on the other, is considered a unit capacitor; then the laminated ceramic capacitor 10 is deemed to contain a total of 19 unit capacitors UC1 to UC19 arranged in the laminating direction, with these unit capacitors UC1 to UC19 connected in parallel to the pair of external electrodes 14, as shown in FIG. 1 (C).

FIG. 1 (D) is a two-dimensional graph plotting the respective capacitances of the total of 19 unit capacitors UC1 to UC19 arranged in the laminating direction, where the respective capacitances of the total of 19 unit capacitors UC1 to UC19 were measured separately using a manual prober and an LCR meter (4284A manufactured by Agilent) on the laminated ceramic capacitor 10 with its pair of external electrodes 14 removed.

As is evident from FIG. 1 (D), the respective capacitances of the total of 19 unit capacitors UC1 to UC19 arranged in the laminating direction of the laminated ceramic capacitor 10 are distributed in such a way that the capacitance at the center in the laminating direction is lower than the capacitances at both ends in the laminating direction. To be specific, the respective capacitances of the total of 19 unit capacitors UC1 to UC19 arranged in the laminating direction are distributed in such a way that they gradually decrease from the unit capacitors UC1 and UC19 at both ends in the laminating direction toward the unit capacitor UC10 at the center in the laminating direction.

<<First Manufacturing Method for Laminated Ceramic Capacitor>>

Next, the first manufacturing method suitable for obtaining the laminated ceramic capacitor 10 is explained.

Prior to manufacturing, a dielectric layer slurry containing barium titanate powder, ethanol (solvent), polyvinyl butyral (binder) and other additives such as dispersant, as well as an internal electrode layer paste containing nickel powder, terpineol (solvent), ethyl cellulose (binder), and other additives such as dispersant, are prepared.

Then, the dielectric layer slurry is applied onto a carrier film using a die-coater, etc., to a specified thickness and width and then dried to produce a first sheet, while the internal electrode layer paste is matrix-printed onto the first sheet using a screen printer, etc., to a specified thickness and shape and then dried to produce a second sheet.

Then, a specified number of third sheets of specified shape that have been stamped out of the first sheet using a pickup head with stamping blade and heater, etc., are laminated and then thermally bonded, on top of which a specified number of fourth sheets of specified shape that have been stamped out of the second sheet (including matrix-printed and dried sheets) are laminated and then thermally bonded, on top of which a specified number of third sheets of specified shape that have been stamped out of the first sheet are laminated and then thermally bonded, the result of which is then thermally bonded for the last time using a hot hydrostatic press, etc., to produce a non-sintered laminate sheet.

Then, the non-sintered laminate sheet is cut in a lattice pattern using a dicing machine, etc., to produce non-sintered chips corresponding to capacitor bodies 11.

Then, multiple non-sintered chips are introduced to a sintering furnace and sintered (including binder removal and sintering) in a reducing ambience or ambience of low partial oxygen pressure based on a temperature profile according to the nickel powder and barium titanate powder. In this sintering step, it is essential that temperature is raised quickly during sintering, such as at 5000 to 10000° C./hr, so as to actively slow the progression of sintering from the surface toward the center of the non-sintered chip.

Then, an external electrode paste (the internal electrode layer paste is carried over) is applied to both ends of the sintered chip in the length direction using a roller applicator, etc., and baked in the same ambience to form base layers, after which surface layers, or intermediate layers and surface layers, are formed on the surface of the base layers by means of electroplating, etc., to produce a pair of external electrodes.

<<Second Manufacturing Method for Laminated Ceramic Capacitor>>

Next, the second manufacturing method suitable for obtaining the laminated ceramic capacitor 10 is explained.

This second manufacturing method is different from the first manufacturing method in that: (1) in the preparation step, a second dielectric layer slurry obtained by adding a sintering auxiliary to the dielectric layer slurry is prepared in addition to the dielectric layer slurry and internal electrode layer slurry; (2) in the sheet production step, a fifth sheet is produced, in addition to the second sheet, by applying the second dielectric layer slurry onto a carrier film using a die-coater, etc., to a specified thickness and width and then drying the slurry; and (3) in the non-sintered laminate sheet production step, a specified number of sixth sheets of specified shape that have been stamped out of the fifth sheet are laminated and then thermally bonded, on top of which a specified number of fourth sheets of specified shape that have been stamped out of the second sheet (including matrix-printed and dried sheets) are laminated and then thermally bonded, on top of which a specified number of sixth sheets of specified shape that have been stamped out of the fifth sheet are laminated and then thermally bonded, the result of which is thermally bonded for the last time using a hot hydrostatic press, etc., to produce a non-sintered laminate sheet. Other processes are the same as under the first manufacturing method and therefore not explained.

The reason why the second dielectric layer slurry is prepared in the preparation step, the fifth sheet is produced using the second dielectric layer slurry in the sheet production step, and sixth sheets obtained from the fifth sheet are laminated at top and bottom in the non-sintered laminate sheet production step, is to cause sintering to progress more markedly in the areas corresponding to the top and bottom margins of the non-sintered chip during sintering in the sintering step. Silica or rare earth oxide can be used for the sintering auxiliary in the second dielectric layer slurry, where preferably the sintering auxiliary is added by 0.5 to 5.0 percent by weight.

<<Samples 1 to 6 and Comparative Samples 1 to 3>>

Next, Samples 1 to 6 and Comparative Samples 1 to 3, which were prepared to check the structure and characteristics of the laminated ceramic capacitor 10, are explained.

Samples 1, 3 and 5 were manufactured according to the first manufacturing method, Samples 2, 4 and 6 were manufactured according to the second manufacturing method, and Comparative Samples 1 to 3 were manufactured according to the first manufacturing method except that temperature was raised normally, such as at 300 to 600° C./hr, in the sintering step.

Samples 1 to 6 and Comparative Samples 1 to 3 were all of Type 1005 (reference length, width and height dimensions of 1.0 mm, 0.5 mm and 0.5 mm, respectively) and all had 100 internal electrode layers. In addition, the dielectric layer thickness was 1.0 µm and internal electrode layer thickness was 1.2 µm for Samples 1 and 2 and Comparative Sample 1, dielectric layer thickness was 0.8 µm and internal electrode layer thickness was 1.2 µm for Samples 3 and 4 and Comparative Sample 2, and dielectric layer thickness was 3.0 µm and internal electrode layer thickness was 1.2 µm for Samples 5 and 6 and Comparative Sample 3.

In other words, when the section constituted by two internal electrode layers positioned adjacent to each other in the laminating direction and one dielectric layer present between the two internal electrode layers is considered a unit capacitor, then each of Samples 1 to 6 and Comparative Samples 1 to 3 is deemed to contain a total of 99 unit capacitors UC1 to UC99 arranged in the laminating direction, with these unit capacitors UC1 to UC99 connected in parallel to the pair of external electrodes.

<<Structure Check Using Samples 1 to 6 and Comparative Samples 1 to 3>>

Next, the results of checking the structures using Samples 1 to 6 and Comparative Samples 1 to 3 thus prepared are explained.

Figures 2, 3:
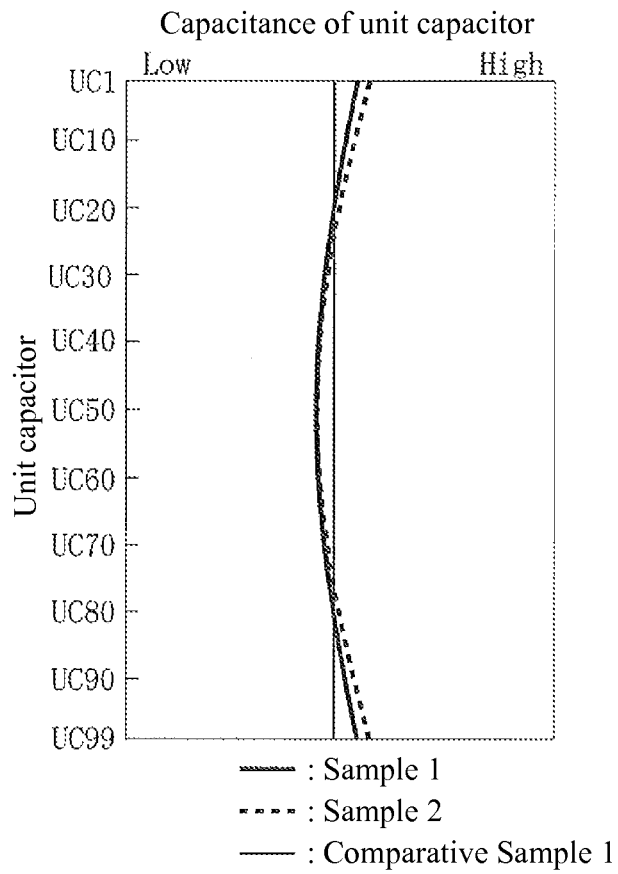
FIG. 2 shows the distributions of the capacitances of unit capacitors contained in Samples 1 and 2 and Comparative Sample 1, respectively.
FIG. 3 shows the capacitances and HALT results of Samples 1 to 6 and Comparative Samples 1 to 3, respectively.

Just like FIG. 1 (D), FIG. 2 is a two-dimensional graph plotting the respective capacitances of the total of 99 unit capacitors UC1 to UC99 arranged in the laminating direction, where the respective capacitances of the total of 99 unit capacitors UC1 to UC99 were measured separately using a manual prober and a LCR meter (4284A manufactured by Agilent) on each of Samples 1 and 2 and Comparative Sample 1 with its pair of external electrodes removed.

As is evident from FIG. 2, with Samples 1 and 2 the respective capacitances of the total of 99 unit capacitors UC1 to UC99 arranged in the laminating direction are distributed in such a way that the capacitance at the center in the laminating direction is lower than the capacitances at both ends in the laminating direction; to be specific, the respective capacitances of the total of 99 unit capacitors UC1 to UC99 arranged in the laminating direction are distributed in such a way that they gradually decrease from the unit capacitors UC1 and UC99 at both ends in the laminating direction toward the unit capacitor UC50 at the center in the laminating direction. With Comparative Sample 1, on the other hand, the respective capacitances of the total of 99 unit capacitors UC1 to UC99 are distributed roughly linearly albeit with slight scattering in both directions.

In other words, the distribution of the respective capacitances of the total of 99 unit capacitors UC1 to UC99 arranged in the laminating direction in the case of Sample 1 or 2 is similar to the distribution of the respective capacitances of the total of 19 unit capacitors UC1 to UC19 as shown in FIG. 1 (D), and this distribution is clearly different from the distribution in the case of Comparative Sample 1.

Although not shown in the graph, with Samples 3, 4, and 5 the respective capacitances of the total of 99 unit capacitors UC1 to UC99 arranged in the laminating direction are also distributed in such a way that the capacitance at the center in the laminating direction is lower than the capacitances at both ends in the laminating direction; to be specific, the respective capacitances of the total of 99 unit capacitors UC1 to UC99 arranged in the laminating direction are distributed in such a way that they gradually decrease from the unit capacitors UC1 and UC99 at both ends in the laminating direction toward the unit capacitor UC50 at the center in the laminating direction. With Comparative Samples 2 and 3, on the other hand, the respective capacitances of the total of 99 unit capacitors UC1 to UC99 are distributed roughly linearly albeit with slight scattering in both directions.

<<Characteristic Check Using Samples 1 to 6 and Comparative Samples 1 to 3>>

Next, the results of checking the characteristics using Samples 1 to 6 and Comparative Samples 1 to 3 thus prepared are explained.

FIG. 3 is a table showing in the "Capacitance" field the respective capacitances of Samples 1 to 6 and Comparative Samples 1 to 3 measured (in units of nF) using an LCR meter (4284A manufactured by Agilent) prior to HALT as described below, and in the "HALT result" field the results (in units of sec) of HALT (highly accelerated life test) of Samples 1 to 6 and Comparative Samples 1 to 3.

The HALT conditions used for Samples 1 and 2 and Comparative Sample 1 were 125° C. in temperature and 20 V in applied voltage, HALT conditions used for Samples 3 and 4 and Comparative Sample 2 were 125° C. in temperature and 10 V in applied voltage, and HALT conditions used for Samples 5 and 6 and Comparative Sample 3 were 125° C. in temperature and 50 V in applied voltage. In addition, the HALT results of Samples 1 to 6 and Comparative Samples 1 to 3 each indicate the time it took for the insulation resistance to drop to $1\times10^5\Omega$ or less after the start of HALT.

As is evident from FIG. 3, while there are no marked differences between the capacitances of Samples 1 and 2 and capacitance of Comparative Sample 1, the HALT results of Samples 1 and 2 are better than the HALT result of Comparative Sample 1; to be specific, the HALT result of Sample 1 is approx. 2.4 times the HALT result of Comparative Sample 1, and the HALT result of Sample 2 is approx. 2.4 times the HALT result of Comparative Sample 1.

In addition, while there are no marked differences between the capacitances of Samples 3 and 4 and capacitance of Comparative Sample 2, the HALT results of Samples 3 and 4 are better than the HALT result of Comparative Sample 2; to be specific, the HALT result of Sample 3 is approx. 29.4 times the HALT result of Comparative Sample 2, and the HALT result of Sample 4 is approx. 28.5 times the HALT result of Comparative Sample 2.

Furthermore, while there are no marked differences between the capacitances of Samples 5 and 6 and capacitance of Comparative Sample 3, the HALT results of Samples 5 and 6 are better than the HALT result of Comparative Sample 3; to be specific, the HALT result of Sample 5 is approx. 1.5 times the HALT result of Comparative Sample 3, and the HALT result of Sample 6 is approx. 1.4 times the HALT result of Comparative Sample 3.

<<Substantiation of Effects Based on Check Results>>

Next, the effects of the present invention are substantiated based on the aforementioned check results of structures and characteristics.

With Samples 1 to 6, the respective capacitances of the total of 99 unit capacitors UC1 to UC99 arranged in the laminating direction are distributed in such a way that the capacitance at the center in the laminating direction is lower than the capacitances at both ends in the laminating direction, or specifically in such a way that they gradually decrease from the unit capacitors UC1 and UC99 at both ends in the laminating direction toward the unit capacitor UC50 at the center in the laminating direction; Comparative Samples 1 to 3, on the other hand, have no such distribution (refer to FIG. 2). In addition, the HALT results of Samples 1 and 2 are better than the HALT result of Comparative Sample 1, HALT results of Samples 3 and 4 are better than the HALT result of Comparative Sample 2, and HALT results of Samples 5 and 6 are better than the HALT result of Comparative Sample 3 (refer to FIG. 3).

In other words, it can be said that laminated ceramic capacitors whose multiple unit capacitors arranged in the laminating direction have their respective capacitances distributed in such a way that the capacitance at the center in the laminating direction is lower than the capacitances at both ends in the laminating direction, or specifically in such a way that they gradually decrease from the unit capacitors at both ends in the laminating direction toward the unit capacitor at the center in the laminating direction, are more resistant to deterioration of insulation resistance compared to laminated ceramic capacitors having no such distribution.

In addition, the HALT results of Samples 1 and 2 whose dielectric layer thickness is 1.0 µm are both approx. 2.4 times the HALT result of Comparative Sample 1, HALT results of Samples 3 and 4 whose dielectric layer thickness is 0.8 µm are approx. 29.4 times and approx. 28.5 times the HALT result of Comparative Sample 2, respectively, and HALT results of Samples 5 and 6 whose dielectric layer thickness is 3.0 µm are approx. 1.5 times and approx. 1.4 times the HALT result of Comparative Sample 3, respectively (refer to FIG. 3).

In other words, it can be said that laminated ceramic capacitors whose dielectric layer thickness is 1.0 µm or less can suppress the deterioration of insulation resistance more effectively compared to laminated ceramic capacitors whose dielectric layer thickness is greater than 1.0 µm. Needless to say, even laminated ceramic capacitors whose dielectric layer thickness is greater than 1.0 µm can still suppress the deterioration of insulation resistance sufficiently so long as their multiple unit capacitors arranged in the laminating direction have their respective capacitances distributed in the aforementioned way.

<<Example of Variation of Manufacturing Method for Laminated Ceramic Capacitor>>

Under the first and second manufacturing methods, temperature was raised quickly during sintering in the sintering step to obtain a laminated ceramic capacitor having the aforementioned distribution when its dielectric layers constituting the unit capacitors have roughly the same thickness and composition; however, a laminated ceramic capacitor having the aforementioned distribution can also be obtained by other manufacturing methods where temperature is not raised quickly.

For example, a laminated ceramic capacitor having the aforementioned distribution so that the respective capacitances of multiple unit capacitors arranged in the laminating direction are distributed in such a way that the capacitance at the center in the laminating direction is lower than the capacitances at both ends in the laminating direction can also be obtained by changing the thicknesses of dielectric layer sheets so that the thickness of the dielectric layer constituting each unit capacitor becomes greater at the center in the laminating direction than the ends in the laminating direction, or by changing the composition of dielectric layer sheets so that the dielectric constant of the dielectric layer constituting each unit capacitor becomes lower at the center in the laminating direction than the ends in the laminating direction.

DESCRIPTION OF THE SYMBOLS

10—Laminated ceramic capacitor, 11—Capacitor body, 12—Internal electrode layer, 13—Dielectric layer, 14—External electrode, UC—Unit capacitor.

What is claimed is:

1. A laminated ceramic capacitor with a capacitor body having a structure in which multiple internal electrode layers are laminated with dielectric layers placed in between, wherein when a section constituted by two internal electrode layers positioned adjacent to each other in a laminating direction and one dielectric layer present between the two internal electrode layers is considered a unit capacitor, then respective capacitances of multiple unit capacitors arranged in the laminating direction are distributed in such a way that the capacitance at a center in the laminating direction is lower than the capacitances at both ends in the laminating direction, wherein the respective capacitances of multiple unit capacitors arranged in the laminating direction are distributed in such a way that they gradually decrease from the unit capacitors at both ends in the laminating direction toward the unit capacitor at the center in the laminating direction.

2. A laminated ceramic capacitor according to claim 1, wherein the dielectric layers each have a thickness of 1.0 µm or less.

3. A laminated ceramic capacitor according to claim 1, wherein a number of the internal electrode layers is 100 or more.

4. A laminated ceramic capacitor according to claim 2, wherein a number of the internal electrode layers is 100 or more.

5. A laminated ceramic capacitor according to claim 1, wherein the capacitance distribution in the laminating direction is formed as a result of sintering a laminate for the laminated ceramic capacitor at a temperature rising rate of 5,000° C./hr to 10,000° C./hr.

6. A laminated ceramic capacitor according to claim 1, wherein unit capacitors at both ends in the laminating direction contain more sintering auxiliaries than do unit capacitors at the center in the laminating direction.

7. A laminated ceramic capacitor according to claim 1, wherein the capacitor body further comprises two different external electrodes, and the multiple internal electrode layers are alternately connected to the different external electrodes in the laminating direction.

* * * * *